US007352386B1

(12) United States Patent
Shum et al.

(10) Patent No.: US 7,352,386 B1
(45) Date of Patent: Apr. 1, 2008

(54) METHOD AND APPARATUS FOR RECOVERING A THREE-DIMENSIONAL SCENE FROM TWO-DIMENSIONAL IMAGES

(75) Inventors: Heung-Yeung Shum, Bellevue, WA (US); Zhengyou Zhang, Redmond, WA (US); Qifa Ke, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 09/338,176

(22) Filed: Jun. 22, 1999

(51) Int. Cl.
*H04N 13/00* (2006.01)
(52) U.S. Cl. .......................... 348/42; 348/51
(58) Field of Classification Search .............. 348/42, 348/51; 345/419, 420; 382/236, 285; 725/131; 375/240.16
See application file for complete search history.

(56) References Cited

U.S. PATENT DOCUMENTS

| 5,511,153 | A | * | 4/1996 | Azarbayejani et al. ...... 345/419 |
| 5,548,667 | A | * | 8/1996 | Tu ............................. 382/285 |
| 5,612,743 | A | * | 3/1997 | Lee ........................ 375/240.16 |
| 5,729,471 | A | * | 3/1998 | Jain et al. .................... 725/131 |
| 5,774,591 | A | * | 6/1998 | Black et al. ................. 382/236 |
| 6,046,745 | A | * | 4/2000 | Moriya et al. .............. 345/420 |

FOREIGN PATENT DOCUMENTS

EP        0 681 230 A1 * 11/1995

OTHER PUBLICATIONS

A. Azarbayejani and A.P. Pentland, "Recursive Estimation of Motion Structure, and Focal Length" IEEE Transactions on Pattern Analysis and Machine Intelligence, 17(6);562-575, Jun. 1995.
N. Ayache, "Artificial Vision for Mobile Robots: Stereo Vision and Multisensory Perception" InterEditions., Paris, 1989.
M. Pollefeys, R. Koch, and L. Van Gool, "Self-Calibration and Metric Reconstruction in Spite of Varying and Unknown Internal Camera Parameters" Sixth International Conference on Computer Vision (ICCV'98), pp. 90-95, Bombay, Jan. 1998.
J. Weng, N. Ahuja, and T.S. Huang, "Optimal Motion and Structure Estimation" IEEE Transactions on Pattern Analysis and Machine Intelligence, 15(9):864-884, Sep. 1993.

(Continued)

*Primary Examiner*—Allen Wong
(74) *Attorney, Agent, or Firm*—Klarquist Sparkman, LLP (57) ABSTRACT

A method and apparatus for recovering a three-dimensional (3D) scene from two-dimensional (2D) images. A sequence of images is divided into a number of smaller segments and a 3D reconstruction is performed on each segment individually. All the reconstructed segments are then combined together through an efficient bundle adjustment to complete the 3D reconstruction. Segmenting may be achieved by dividing the segments based on the number of feature points that are in each frame. The number of frames per segment is reduced by creating virtual key frames. The virtual key frames encode the 3D structure for each segment, but are only a small subset of the original frames in the segment. A final bundle adjustment is performed on the virtual key frames, rather than all of the original frames. Thus, the final bundle adjustment is two orders of magnitude faster than a conventional bundle adjustment.

34 Claims, 8 Drawing Sheets

OTHER PUBLICATIONS

Beardsley, P. et al., "3D Model Acquisition from Extended Image Sequences" In *Fourth Eueopean Conference on Computer Vision (ECCV'96)*, vol. 2, pp. 683-695, Cambridge, England, Apr. 1996.

Hartley, R.I., "Euclidean Reconstuction from Uncalibrated Views" *Second Eueopean Workshop on Invariants*, pp. 187-202, Ponta Delgada, Azores, Oct. 1993.

McLauchlan, P.F. et al., "Recursive Affine Structure and Motion from Image Sequences" *Third Eueopean Conference on Computer Vision (ECCV'94)*, vol. 1, pp. 217-224, Stockholm, Sweden, May 1994.

Szeliski, R. and Kang, S.B. "Recovering 3D Shape and Motion from Image Streams Using Nonlinear Least Squares" *Journal of Visual Communication and Image Representation*, 5(1):10-28, Mar. 1994.

Sturm, P. and Triggs, W. "A Factorization Based Algorithm for Multi-Image Projective Structure and Motion" *Fourth European Conference on Computer Vision (ECCV'96)*, vol. 1, pp. 709-720, Cambridge, England, Apr. 1996.

Horn, B.K.P. et al. "Closed-form solution of Absolute Orientation Using Orthonormal Matrices" *Journal of the Optical Society of America S*, 5(7):1127-1135, 1998.

Tomasi, C. "Shape and Motion from Image Streams Under Orthography: A Factorization Method" *International Journal of Computer Vision*, 9(2): 137-154, Nov. 1992.

A.W. Fitzgibbon and A. Zisserman. Automatic camera recovery for closed and open image sequences. In *Fifth European Conference on Computer Vision (ECCV'98)*, pp. 311-326, Freiburg, Germany, Jun. 1998. Springer Verlag.

J. Shi and C. Tomasi. Good features to track. In IEEE *Computer Society Conference on Computer Vision and Pattern Recognition (CVPR'94)*, pp. 593-600, Seattle, Washington, Jun. 1994. IEEE Computer Society.

Z. Zhang, Determining the epipolar geometry and its uncertainty: A review. *International Journal of Computer Vision*, 27(2):161-195, 1998.

S. Gortler, L. He, and M. Cohen, Rendering layered depth images, pp. 1-11.

R. I. Hartley, In defense of the eight-point algorithm, *IEEE Transactions On Pattern Analysis And Machine Intelligence*, vol. 19, No. 6, Jun. 1997.

\* cited by examiner

METHOD AND APPARATUS FOR RECOVERING A THREE-DIMENSIONAL SCENE FROM TWO-DIMENSIONAL IMAGES

FIELD OF THE INVENTION

The present invention relates to three-dimensional computer graphics, and, more particularly, relates to reconstructing a three-dimensional scene from a sequence of two-dimensional images.

BACKGROUND AND SUMMARY OF THE INVENTION

The availability of computer graphics is becoming increasingly important to the growth of entertainment-related applications including film animation tools, as well as lower resolution games and multimedia products for the home. A few of the many other areas touched by computer graphics include education, video conferencing, video editing, interactive user interfaces, computer-aided design and computer aided manufacturing (CAD/CAM), scientific and medical imaging, business applications and electronic publishing.

Although there are numerous ways to categorize graphics processing, one common approach is to describe an image in terms of dimensions of objects in the image. For example, a graphics system may represent objects in two dimensions ("2D") where features in the object have x and y coordinates. Alternatively, objects may be represented in three dimensions ("3D") where features in the object have x, y, and z coordinates. Most people are familiar with viewing images in 2D since computer monitors display images in 2D. However, if the computer maintains a graphical model representing an object in three-dimensions, the computer can alter the displayed image on a 2D display to illustrate a different perspective of the object in 3D space. For example, a user may view an image on a traditional computer screen from one perspective and see various lighting and shadowing changes as the user views the image from a different perspective. Thus, a user perceives the displayed objects as being in 3D.

A 3D scene that is displayed to a user may be generated from a 3D synthetic scene, which is generated by a computer, or a real scene, which can be captured using a camera (e.g., video camera). For either synthetic or real scenes, there are different parameters associated with the scene, such as the 3D structure associated with any object in the scene and the camera movement (e.g., rotation and translation) for a real or imaginary camera capturing the scene. Thus, it is desirable to automatically recover the structure of a 3D scene together with 3D camera positions from a sequence of images (e.g., video images) acquired by an unknown camera undergoing unknown movement.

Recovering such a 3D scene is often accomplished using structure-from-motion (SFM) algorithms. SFM has been studied extensively because of its applications in robotics, video editing and image based modeling and rendering. Some important aspects of SFM calculations include identifying multiple feature points in images, using a long baseline, and efficient bundle adjustment. A feature point is any point in the image that can be tracked well from one frame to another. Typically, corners of an object are easily identifiable and are considered good feature points. The base line is associated with how a camera is moving in relation to an object depicted in an image. Bundle adjustment is a non-linear minimization process that is typically applied to all of the input frames and features of the input image stream. Essentially, bundle adjustment is a non-linear averaging of the features over the input frames to obtain the most accurate 3D structure and camera motion.

There are, however, problems with conventional 3D reconstruction. For example, the bundle adjustment used in 3D reconstruction requires a good initial estimate of both 3D structure and camera motion. Additionally, bundle adjustment is computationally expensive because it involves all input frames and features. For example, the complexity of interleaving bundle adjustment for each iteration step is a function of $mn^3$ where m is the number of feature points and n is the number of frames. Thus, bundle adjustment computed over all the frames is time consuming and slows the entire 3D reconstruction. For this reason, most systems use relatively short or sparse image sequences. In practice, however, structure from motion is often applied to a long video sequence.

Recently a paper entitled "*Automatic Camera Recovery for Closed or Open Image Sequences*" by Fitzgibbon and Zisserman (ECCV '98) describes a hierarchical approach by building local structure from image triplets, which are three sequential images. For this technique to be effective, an assumption is made that the sequence is sparse and each triplet forms a long baseline. In practice, however, a dense sequence of video images is often captured resulting in triplets having short baselines resulting in unreliable 3D models.

To overcome the shortcomings of conventional 3D reconstruction, in one aspect of the present invention, a method and apparatus divides a long sequence of frames into a number of smaller segments. A 3D reconstruction is performed on each segment individually. Then all the segments are combined together through an efficient bundle adjustment to complete the 3D reconstruction.

In another aspect of the invention, the number of frames per segment is reduced by creating virtual key frames. The virtual key frames encode the 3D structure for each segment, but are only a small subset of the original frames in the segment. A final bundle adjustment is performed on the virtual key frames, rather than all of the original frames. Thus, the final bundle adjustment is two orders of magnitude faster than a conventional bundle adjustment.

A further aspect of the invention allows for efficient segmenting of the sequence of frames. Instead of dividing the sequence so that segments are equal size (e.g., 100 frames per segment), the segments may vary in size and are divided based on the number of feature points that are in each frame in the segment. For example, any frame that has less than a threshold number of feature points may be moved to a different segment. This approach to segmenting balances the desire for a long baseline and a small tracking error.

In yet another aspect of the invention, a partial model is created by solving a number of long baseline two-frame SFM problems and interpolating motion parameters for in-between frames. The two-frame SFMs are scaled onto a common coordinate system. A bundle adjustment of the two-frame SFMs provides the partial model for the segment. Virtual key frames may then be created from the partial model.

Further features and advantages of invention will become apparent with reference to the following detailed description and accompanying drawings.

DETAILED DESCRIPTION

Exemplary Operating Environment

Figure 1:
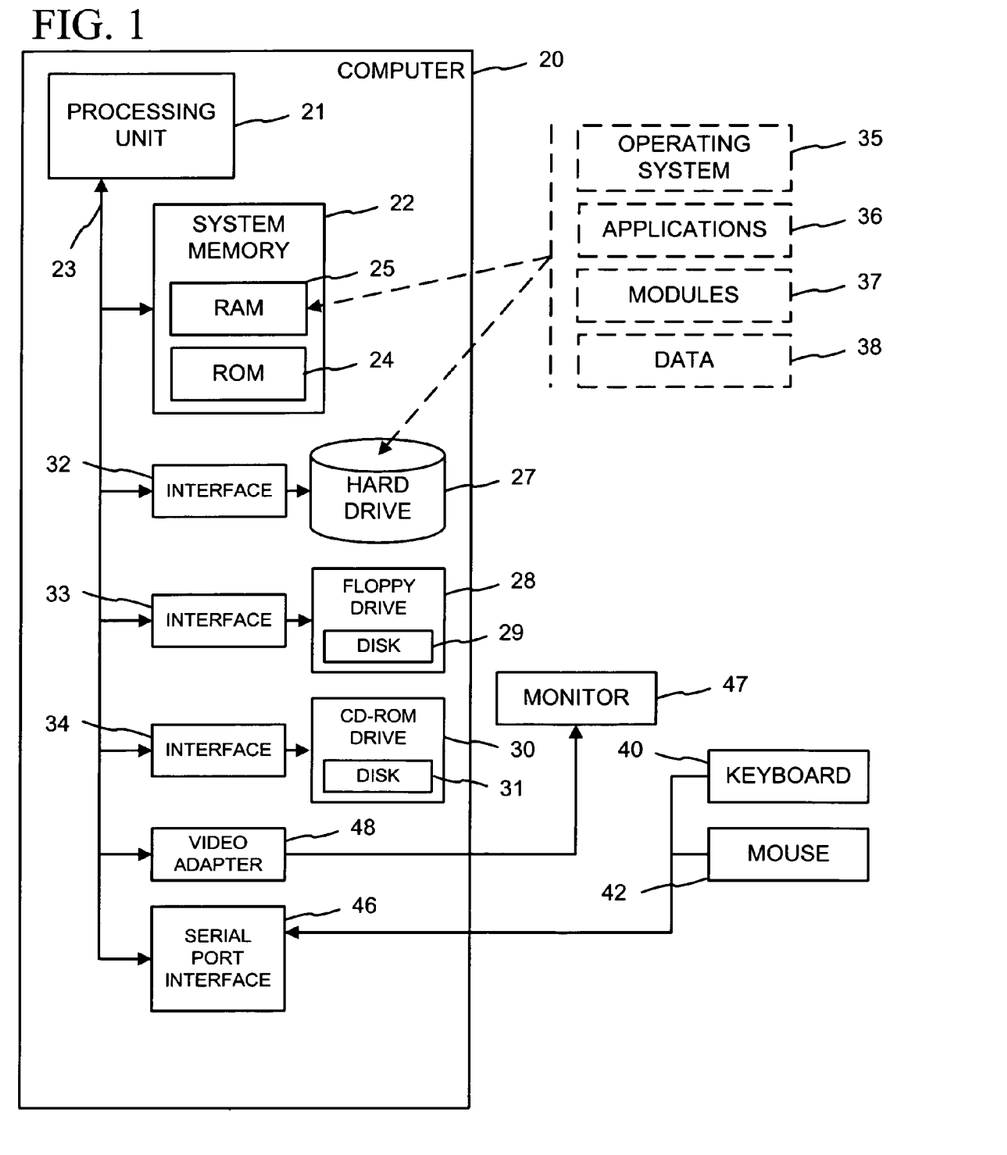
FIG. 1 is a black diagram of a computer system that may be used to implement a method and apparatus embodying the invention for recovering a three-dimensional scene from a sequence of two-dimensional images.

FIG. 1 illustrates an example of a computer system that can serve as an operating environment for the 3D reconstruction. With reference to FIG. 1, an exemplary computer system for implementing the invention includes a computer 20 (such as a personal computer, laptop, palmtop, set-top, server, mainframe, and other varieties of computer), including a processing unit 21, a system memory 22, and a system bus 23 that couples various system components including the system memory to the processing unit 21. The processing unit can be any of various commercially available processors, including Intel x86, Pentium and compatible microprocessors from Intel and others, including AMD; Alpha from Compaq; MIPS from MIPS Technology, NEC, IDT, Siemens, and others; and the PowerPC from IBM and Motorola. Dual microprocessors and other multi-processor architectures also can be used as the processing unit 21.

The system bus can be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, other types of media which are readable by a computer, such as DVDs, can also be used in the exemplary operating environment.

A number of program modules can be stored in the drives and RAM 25, including an operating system 35, one or more application programs 36, other program modules 37, and program data 38.

A user can enter commands and information into the computer 20 through a keyboard 40 and pointing device, such as a mouse 42. Other input devices (not shown) can include a microphone, joystick, game pad, satellite dish, scanner, or the like. These and other input devices are often connected to the processing unit 21 through a serial port interface 46 that is coupled to the system bus, but can be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

In accordance with the practices of persons skilled in the art of computer programming, the illustrated invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

System Overview for 3D Reconstruction

Figure 2:
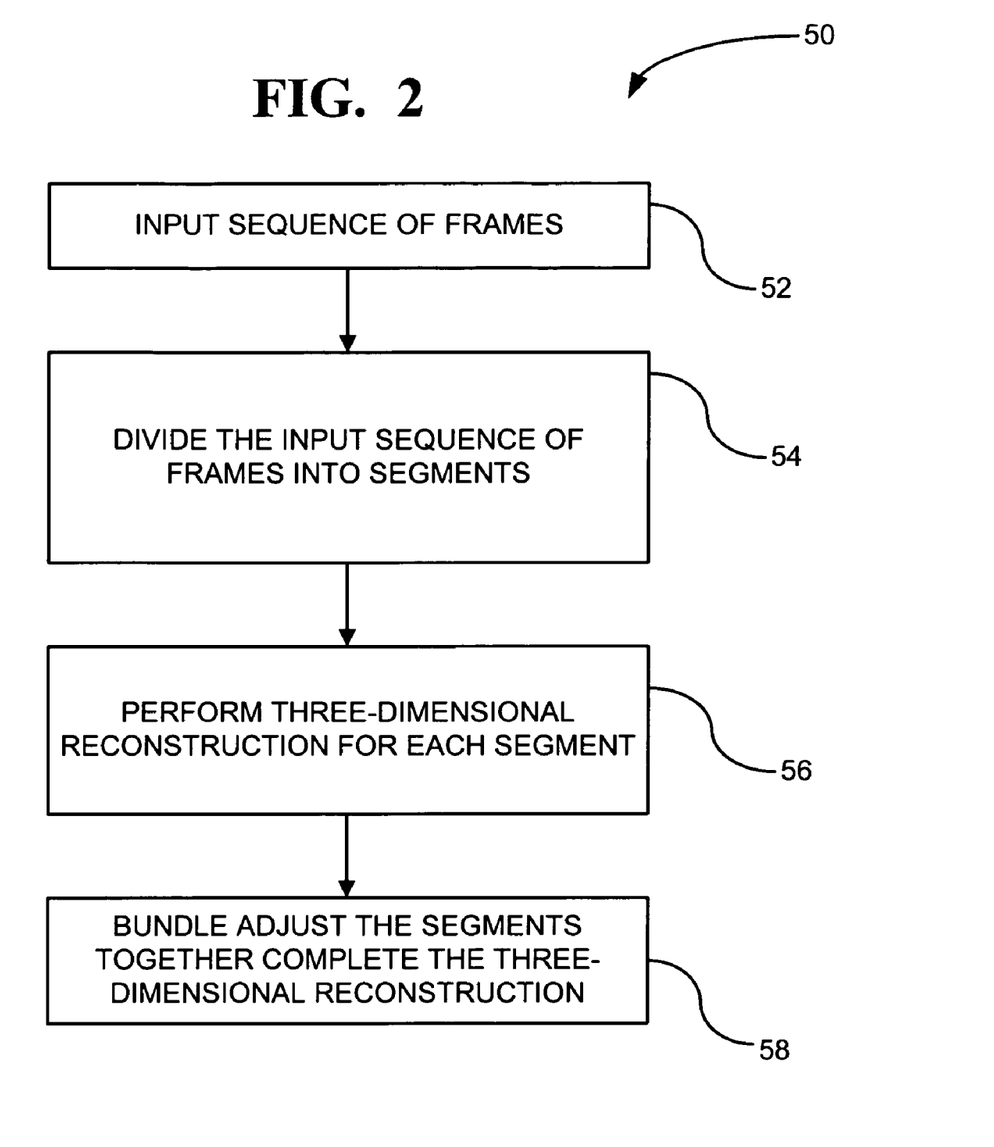
FIG. 2 is a flow chart of a method to recover a three-dimensional scene from a sequence of two-dimensional frames.

FIG. 2 shows a flowchart 50 of a method for reconstructing a 3D scene from an input sequence of frames. In a first box 52, an input sequence of frames is provided. The input sequence of frames may be captured by a camera, such as a video camera, or may be a computer-generated scene. In either case, the frames contain images that are in 2D. The input sequence of images can be any desired number of images. Traditionally, only a small number of frames are used for reconstruction because of the practical limitations of bundle adjustment. The present system, by contrast, can perform 3D reconstruction on a very long sequence of images.

In box 54, the input sequence of frames is divided into segments. The segments are divided based on a percentage of feature points that are tracked in each frame. Consequently, the segments may vary in size (i.e., they may contain a different number of frames). Alternatively, the segments may be divided equally so that each segment contains the same number of frames. Segmenting the input sequence is described further below with relation to FIGS. 4, 5 and 6.

In box 56, a 3D reconstruction is performed for each segment individually. The 3D reconstruction typically includes obtaining three-dimensional coordinates (x, y, and z) for feature points within the segment and camera pose (i.e., rotation and translation) for each frame. Typically, the 3D reconstruction also includes obtaining an uncertainty associated with the segment.

In box 58, the 3D reconstructed segments are combined together to complete the 3D reconstruction for the entire input sequence of frames. Generally, the combining of the reconstructed segments is achieved through bundle adjustment. Bundle adjustment is a non-linear minimization process applied to the segments to essentially perform an averaging of the segments together. In addition, bundle adjustment refers to an optimization process which minimizes the errors between the observed image points and the projections of the reconstructed 3D points. Boxes 56 and 58 are described further below in relation to FIGS. 7 and 8.

Figure 3:
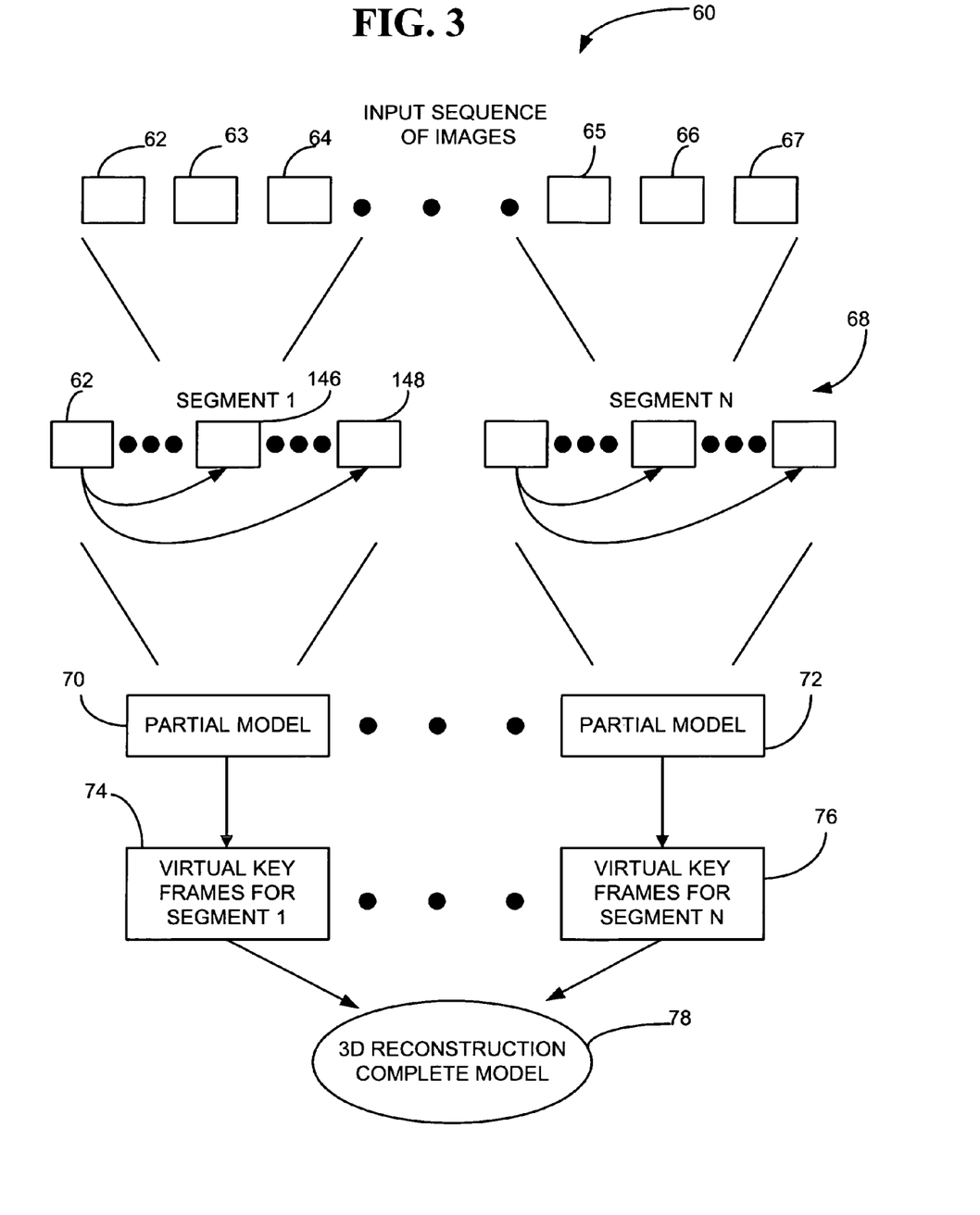
FIG. 3 is a system overview showing an input sequence of images reconstructed into a 3-D model.

FIG. 3 shows a more detailed example of how a 3D reconstruction is created from an input sequence of images. As a starting point, the system has an input sequence of images 60. Some of the images are illustrated as frames, such as frames 62-67. Although only 6 of the frames are shown, the input sequence includes additional frames and can be any desired length. For purposes of illustration, the frames are described herein as the type generated by a standard video camera, although the invention is equally applicable to other types of images, such as computer generated images or real images captured from other types of cameras. Each frame, such as frame 62, typically includes a two-dimensional image. Together the images form a scene.

The sequence of images are divided into segments 68, which are illustrated as segment 1 through segment N, where N is any positive integer. Each segment contains a certain number of frames and the number of frames in each segment may vary in length. For example, segment 1 may contain 100 frames whereas segment N contains 110 frames. As described further below, the number of frames in a segment depends on the ability to track feature points in each frame. Thus, each frame in a given segment will have a minimum number of feature points that are trackable to a base frame in that segment.

For each segment, a partial model is created. For example, for segment 1, a partial model 70 is shown whereas for segment N, a partial model 72 is shown. The partial model contains the same number of frames as the segment it represents. Thus, continuing the example above, the partial model 70 contains 100 frames and the partial model 72 contains 110 frames. The partial models provide three-dimensional coordinates and camera pose for the feature points. The partial model may also contain an uncertainty associated with the segment.

From each partial model, at least two virtual key frames are generated. For example, partial model 70 is represented by two virtual key frames 74 and partial model 72 is represented by two virtual key frames 76. Additional virtual key frames (e.g., 3, 4, 5, etc.) may be used for each segment, but for ease of illustration only two virtual key frames are used. The virtual key frames are representative 3D frames for each segment. The virtual key frames essentially encode the 3-D structure for each segment along with this uncertainty. However, because the virtual key frames are a small subset of a total number of frames in each segment, an efficient bundle adjustment can be performed for all the segments to obtain the final 3-D reconstruction 78.

Segmenting the Input Sequence

Figure 4:
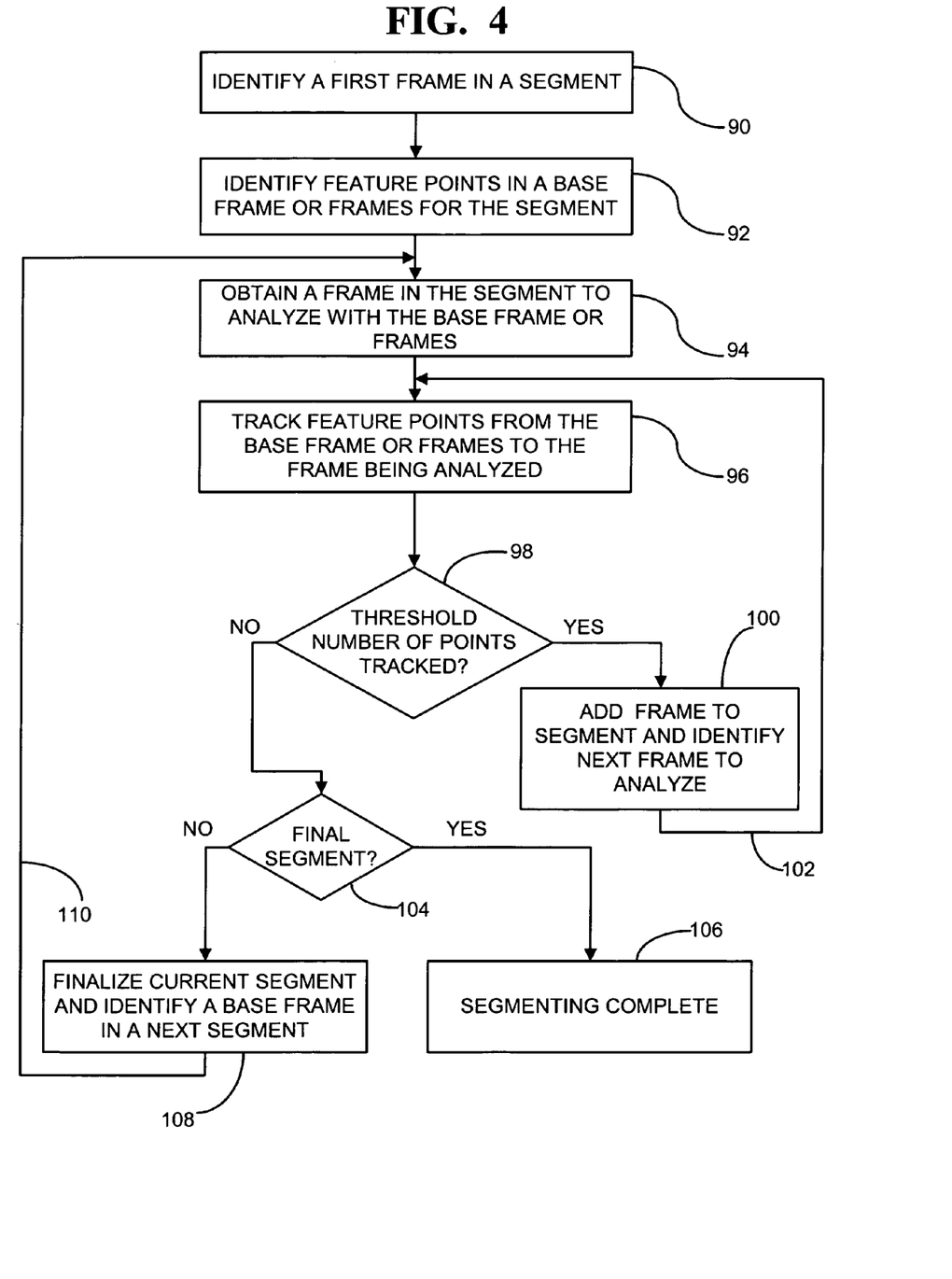
FIG. 4 shows a flow chart of a method for tracking feature points in the input sequence of images.

FIG. 4 is a flow chart of a method for dividing the input sequence of images into segments. In a first box 90, a first frame in a segment is identified. For example, frame 62 (FIG. 3) is a first frame in the input sequence of images and is selected as the first frame for the first segment. Typically, the first frame in the segment is chosen as a base frame.

In box 92, feature points are identified for the base frame or frames in the segment. There are several techniques to identifying feature points. One technique is to scan through pixels in the image and identify any pixels that are corners of the image. The corners are then designated as feature points. Where the image corners are feature points, only one frame needs to be used as a base frame. For example, frame 62 could be used as the base frame.

Another technique that may be used to identify feature points is motion estimation. With motion estimation, two or more frames are used to identify feature points. A potential feature point as identified in a first frame, such as frame 62 (FIG. 3), and then a next frame, such as frame 63 is analyzed to see if the feature point from frame 62 can be tracked to frame 63. Motion estimation is further described below in relation to FIG. 6. Whether using motion estimation or identifying corners, the feature points in one or more base frames for the segment are identified in box 92.

In box 94, a next frame in the segment is obtained to compare with the base frame or frames. For example, frame 64 may be the next frame. In box 96, feature points are identified in the frame 64 and are compared to the feature points in the base frame or frames. In decision 98, a determination is made whether a threshold number of feature points are tracked to the frame being analyzed (e.g., frame 64) from the base frames. The threshold number of points may be 60%, but other desired thresholds can be used. If frame 64 contains more than the threshold number of feature points then the frame is added to this segment (box 100). In the present example, frame 64 is added to segment 1. The next frame (not shown) in the input sequence of images is then used to determine whether it should be added to the segment. As indicated by arrow 102, each frame in an input sequence is taken in order and analyzed to determine whether it contains a threshold number of feature points tracked from the base frame or frames. If so, the frame is added to the current segment. At some point, however, a frame will not contain the threshold number of feature points and the decision made in decision 98 will be negative. At that point, a decision is made whether this is the final segment in the input sequence of images (decision 104). If it is the final segment (segment N), then the segmenting is complete (box 106). If however, there are more images in the input sequence, then the current segment is ended and the next segment is started (box 108). Typically, the last frame in the previous segment is also used as a base frame in the next segment. It also may be desirable to overlap several frames in each segment. Once the base frame is identified for the next segment, arrow 110 indicates that the process starts over for this next segment. Again, feature points are tracked with respect to the new base frame in the next segment. Because the number of frames depends on the feature points tracked between the frames, the segments can vary in length.

Figure 5:
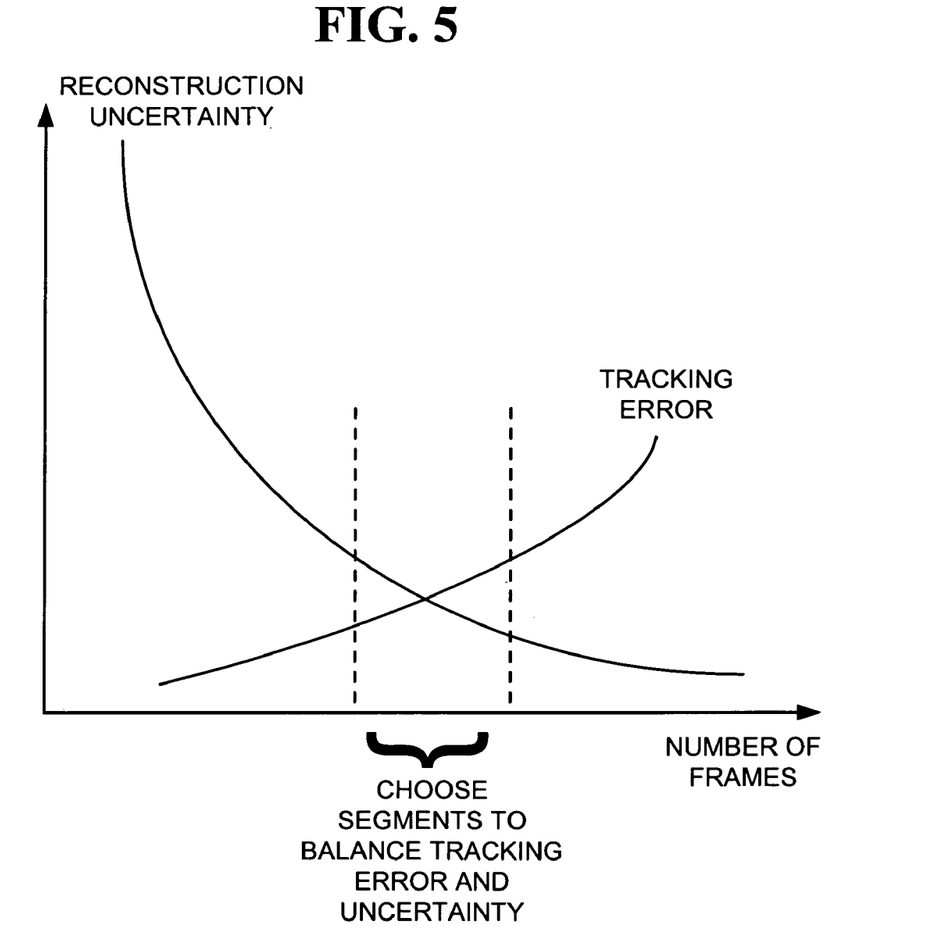
FIG. 5 shows a graph illustrating a balancing between reconstruction uncertainty and tracking error for segmentation.

FIG. 5 shows a graph indicating that segments are chosen to balance the tracking error and reconstruction uncertainty. In general, tracking error increases with the length of the tracking sequence. On the other hand, the shorter the tracking sequences, the more uncertain the estimated epipolar geometry and therefore the 3-D reconstruction. A determination needs to be made in how long to keep tracking features. A good indication is the number of trackable feature points given a threshold of tracking error. Thus, for example, any frame in a segment may have at least a predetermined percentage (e.g., 50%, 60%, etc.) of the trackable features identified in a base frame. Another indication is the percentage of the trackable features that satisfy the epipolar constraint. Specifically, the distance between the features and the epipolar lines (computed through a fundamental matrix) indicates how accurate the tracking result is.

Because automatic feature selection may not always select all of the features of interest in the images, the feature tracker may be an interactive system. First, regions are selected where feature points are to be generated and a determination is made as to how many feature points are desired. Features are then automatically generated in these selected regions. Additional features can be added at any frame. Using this technique, more uniformly distributed feature points are obtained which allows for accurate 3-D reconstruction.

Figure 6:
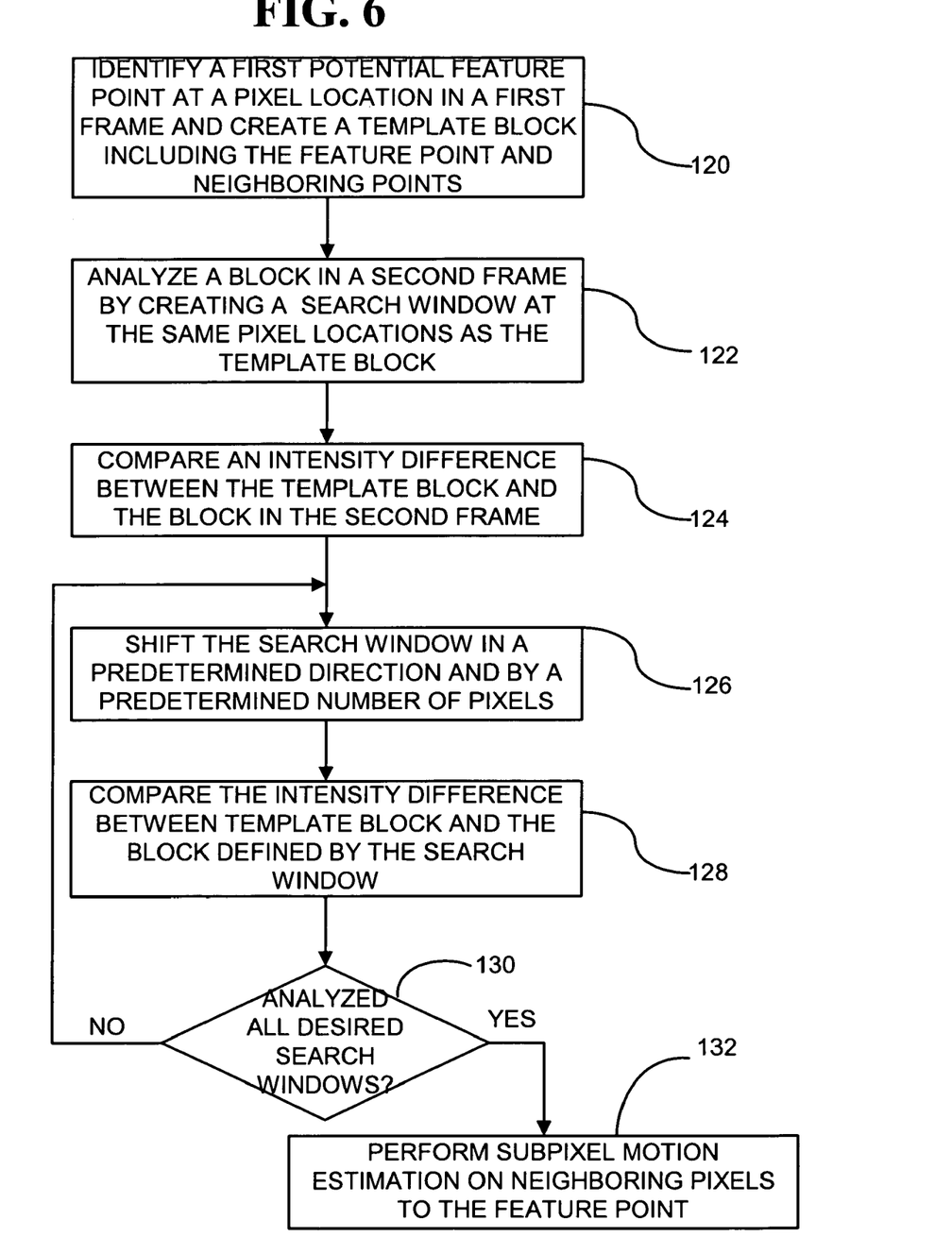
FIG. 6 shows a flow chart of a method for identifying feature points using motion estimation.

FIG. 6 shows an overview for identifying feature points using motion estimation. In box 120, a first potential feature point is identified at a pixel location in a base frame (e.g., frame 62). Neighboring pixel locations around the feature point are identified and are included in a template block that will be analyzed and compared to other frames.

In box 122, a second frame is identified (e.g., frame 63) and a determination is made whether feature points in the second frame can be tracked from the first frame. To make this determination, a search window is created for the second frame. The search window contains the same number of pixels as the template block. First, the search window is focused at the same pixel locations that the template block was located for the first frame. This assumes that the feature point did not move from its pixel location.

In box 124, an intensity difference between the pixels in the template block and the pixels within the search window of the second frame are compared. A low intensity difference indicates that the feature point is tracked in the second frame. However, it is possible that the feature point moved to a new pixel location. Thus, in box 126 the search window in the second frame is shifted a predetermined direction and by a predetermined number of pixels. For example, the search window might be shifted one pixel to the right. The intensity difference is again compared between the block defined by the search window and the template block (box 128). In decision 130, a determination is made whether a full analysis of the second frame is complete. If not, boxes 126 and 128 are repeated. For example, the search window may move to the right two pixels and then to the right three pixels. The search window may then move up, down and to the left in a similar fashion to obtain the intensity difference between the search window and the template block. Using this technique, the feature point can be accurately tracked. Typically, the lowest intensity difference between the template block and the block defined by the search window indicates the location of the feature point.

In box 132, sub-pixel motion estimation on neighboring pixels to the feature point is performed. This helps determine how reliable the motion estimation is for the feature point currently being examined to determine if it is a good feature point.

It may be desirable to select good feature points based on minimum eigenvalues of Hessian matrix of motion estimation. This is described further in the article entitled "*Good features to track*", which is referenced below. Moreover, it may be desirable to interactively select regions of interest and number of good features if necessary; track features with respect to the base frame, and divide the sequence into segments based on the quality of the epipolar constraint.

Creating Partial Models for Each Segment

Figure 7:
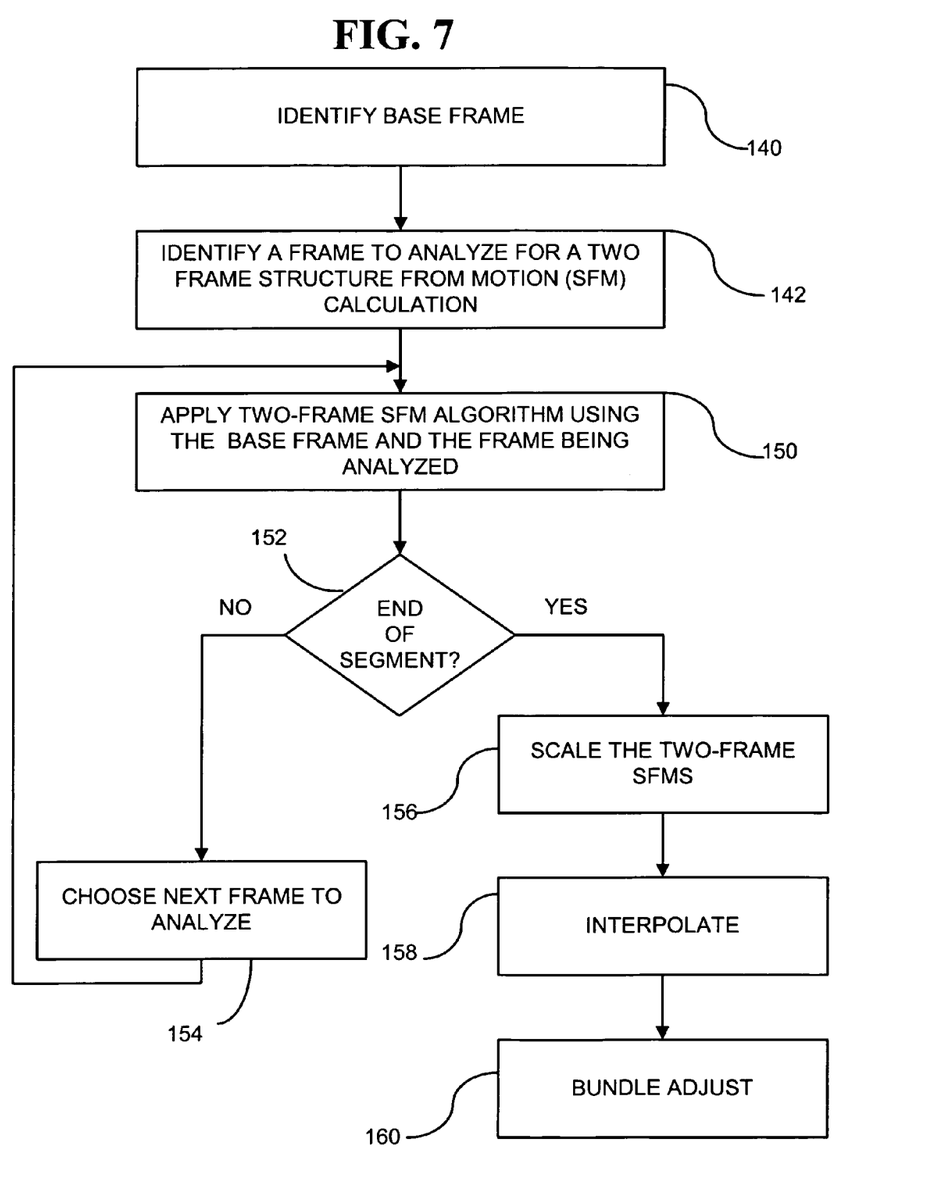
FIG. 7 shows a flow chart of a method for obtaining camera pose and three-dimensional coordinates for each feature point.

FIG. 7 shows a flow chart of a method for creating the partial model for each segment, such as partial models 70, 72 (FIG. 3). The partial model may include an estimation of the camera pose, the three-dimensional coordinates and the uncertainty for each feature point. In box 140, a base frame for the segment is identified. Typically this is the first frame in the segment, but other frames may be used. For purposes of illustration, frame 62 (FIG. 3) is the base frame for segment 1.

In box 142, another frame in the segment is used for a two-frame SFM calculation with the base frame. Instead of performing a two-frame SFM with each frame in the segment, the frames used in the SFM are spaced apart and motion parameters for the in-between frames interpolated. For example, returning to FIG. 3, segment 1 has a base frame 62 and the next frame analyzed is frame 146 which may be five or ten frames away from the base frame. The specific number of frames between the base frame and the analyzed frames is dependent on the system as any number of frames can be used. After the two-frame SFM is performed on frames 62 and 146, another two frame SFM is performed on frames 62 and 148. Frame 148 may be ten or twenty frames away from the base frame. The two-frame SFMs are calculated in a similar fashion until the end of the segment. Those skilled in the art will recognize that two-frame SFMs can also be calculated on every frame instead of spacing the frames apart and interpolating between frames. In such an embodiment, a base frame would not need to be used for the SFM calculation.

Returning to FIG. 7, the two-frame SFM algorithm is applied using the base frame and the current frame being analyzed (box 150). In box 152, a decision is made regarding whether the segment has ended. If not, then the next frame to analyze is chosen in box 154 and the process is repeated. For example, if frame 146 was analyzed, the next frame chosen is frame 148. Although only two SFM calculations are illustrated in FIG. 3, one skilled in the art recognizes that any desired number of SFM calculations may be used. For example, if segment 1 contains 100 frames, 20 SFMs may be calculated (one every 5 frames). The two-frame SFMs result in initialized local models for the frames.

Two-frame SFM is a minimization process that allows the recovery of three-dimensional point structures (3-D coordinates) and camera rotation and translation (camera pose). There are many techniques for performing two-frame SFM. In one technique at least eight feature points are chosen and an equation for the minimization process is derived using a fundamental matrix that describes the relationship between two arbitrary images that have point correspondence. From the fundamental matrix, the camera translation can be recovered. Camera rotation can then be recovered using the fundamental matrix and the camera translation. Since the camera translation and rotation is known, the 3-D structure can be recovered. The invention should not be limited to the type of SFM algorithm that is used. For example, two-frame SFM or three-frame SFM can be used. Examples of different SFM techniques that may be used are described in articles entitled "*Determining the epipolar geometry and its uncertainty. A review*" by Z. Zhang (International Journal of Computer Vision, 27(2):161-195, 1998) and "*3D model acquisition from extended image sequences*" by P. Beardsley et al. (EECV '96).

Once all of the SFMs are completed for a segment, the two-frame SFMs must be scaled since the scaling between each of the two-frame SFMs is unknown (box 156). For an example of how to scale, assume there are two local models (from two different two-frame SFMs but with the same base frame) that are to be combined with unknown scale between them. For example, assume there are 21 frames that are divided into 2 intervals. For each interval, we compute local models of {0, 10} and {0, 20}. The scale between the first model {0, 10} and the second model {0,20} can be computed by:

$$\min_{s} \sum_{i} (x_i^{(1)} - s x_i^{(2)})^2,$$

where $x^{(1)}$ and $x^{(2)}$ are corresponding 3D points of the first model and second model.

Where the same base frame is not used in the SFMs, to merge all partial models into a complete model, the following optimization problem may be solved:

$$\min_{s_{jk}, R_{jk}, t_{jk}} \sum_{i} (x_i^{(j)} - s_{jk}(R_{jk} x_i^{(k)} + t_{jk}))^2$$

where $s_{jk}$ is scale, $R_{jk}$, $t_{jk}$ is the rotation and translation between the two partial models of local segments j and k. For a solution to the above minimization problem can be found in "*Closed-form solution of absolute orientation using orthonormal matrices*" by B. K. P. Horn et al. (Journal of the Optical Society of America, 1988).

Continuing with FIG. 7, in box 158, motion parameters for in-between frames are linearly interpolated to complete the initialization step. Thus, for an example where segment 1 contains 100 frames and 20 SFMs are performed, the linear interpolation will result in 3D coordinates for all 100 frames. The overall process is faster because only a subset of all possible SFMs are calculated and linear interpolation is used to estimate the 3D coordinates for the rest of the frames.

In box 160, bundle adjustment is performed on the SFMs. Bundle adjustment performs simultaneous optimization of 3D point and camera placements by minimizing the squared error between estimated and measured image feature locations. There are two general approaches to bundle adjustment. The first interleaves structure and motion estimation stages as described in "*Optimal motion and structure estimation*" by J. Weng et al. (IEEE Transactions on Pattern Analysis and Machine Intelligence, September 93) and "*Geometrically constrained structure from motion: Points on planes*", by R. Szeliski et al. (European Workshop on 3D structure from multiple images of Large-scale Environments, June 1998). The second simultaneously optimizes for structure and motion "*Euclidean reconstruction from uncalibrated views*" by R. I. Hartley (Second European Workshop on Invariants, October 1993). The first approach has the advantage that each point (or frame) reconstruction problem is decoupled from the other problems, thereby solving much smaller systems.

To estimate structure it is desirable to project the ith 3D point $x_i$ into the kth frame at location $u_{ik}$, i=1, . . . , m, k=1, . . . , n, and the equation used is:

$$u_{ik} \sim V_k R_k (x_i - t_k),$$

where ~ indicates equality up to a scale, $R_k$ is the rotation matrix for camera k, $t_k$ is the location of its optical center, and $V_k$ is its projection matrix (usually assumed to be upper triangular or some simpler form, e.g., diagonal). The location of a 3D point corresponding to an observed image feature is $$x_i = w_{ik} R_k^{-1} V_k^{-1} u_{ik} + t_k,$$

where $w_{ik}$ is an unknown scale factor.

To reconstruct a 3D point location, minimize the following:

$$\sum_{k=1}^{n} \left[ \left( u_{ik} - \frac{p_{k0}^T \tilde{x}_i}{p_{k2}^T \tilde{x}_i} \right)^2 + \left( v_{ik} - \frac{p_{k1}^T \tilde{x}_i}{p_{k2}^T \tilde{x}_i} \right)^2 \right]$$

where $P_{kr}$ are the three rows of the camera or projection matrix $$P_k = V_k R_k [I - t_k]$$

and $$\tilde{x}_i = [x_i | 1]$$

i.e., the homogeneous representation of $x_i$. As pointed out by the Zhang article referenced above, this is equivalent to solving the following overconstrained linear system, $$D_{ik}^{-1} (p_{k0} - u_{ik} p_{k2})^T \tilde{x}_i = 0$$

$$D_{ik}^{-1} (p_{k1} - u_{ik} p_{k2})^T \tilde{x}_i = 0$$

where the weights are given by $$D_{ik} = P_{k2}^T \tilde{x}_i$$

(these are set to $D_{ik} = 1$ in the first iteration).

Because the structure of each point can be estimated independently given the motion parameters, only m linear systems of size 2n×3 need to be solved.

Unfortunately, estimation of camera motion parameters is not independent. A minimization problem over 6(n–1)-1 space with 2 nm constraints should be conducted, i.e., $$\min_{\{m_k\}} \sum_{i=1}^{m} \min_{x_i} \sum_{k=1}^{n} \left[ \left( u_{ik} - \frac{p_{k0}^T \tilde{x}_i}{p_{k2}^T \tilde{x}_i} \right)^2 + \left( v_{ik} - \frac{p_{k1}^T \tilde{x}_i}{p_{k2}^T \tilde{x}_i} \right)^2 \right]$$

At each iteration for motion parameters, the optimization of the structure parameters is performed as already described.

To update $P_k$, a linearized least squares to reconstruct Euclidean motion parameters $(V_k R_k [I - t_k])$ is applied. The following updates are assumed:

$$R_k \leftarrow R_k (I + [\omega_k] x), t_k \leftarrow t_k + \delta t_k.$$

The rotation and translation estimates can then be updated using this equation and using Rodriguez's formula for the rotation matrix (See "*Vision Stereoscopique et Perception Multisensorielle*" by N. Ayache, InterEditions, 1989).

Creating Virtual Key Frames and 3-D Reconstruction

Figure 8:
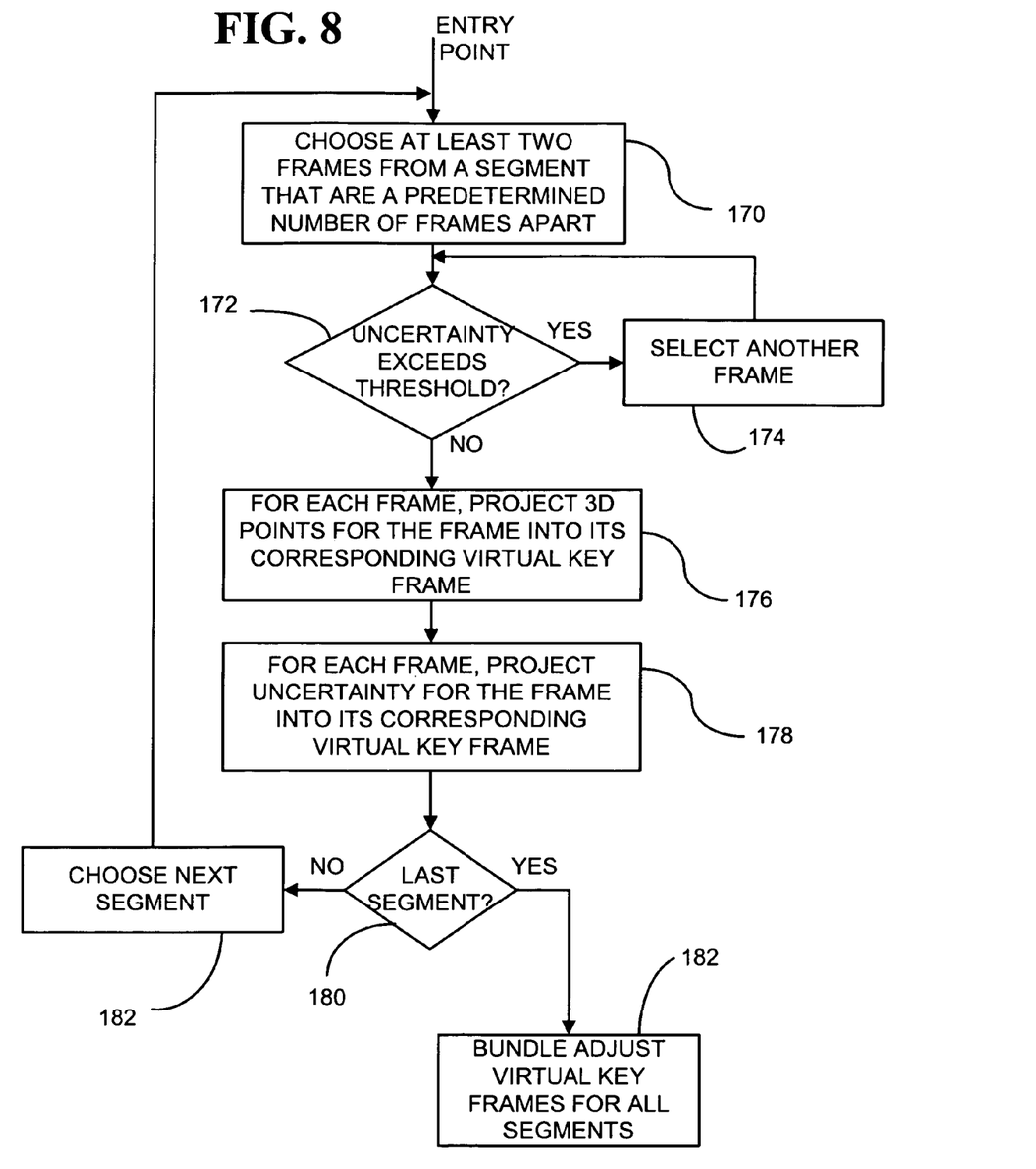
FIG. 8 shows a flow chart of a method for creating virtual key frames for the segments and for bundle adjusting the segments to obtain the 3-D reconstruction.

FIG. 8 shows how virtual key frames are created. In box 170, two frames are chosen from a segment that are a predetermined number of frames apart. For example, if a segment contains 100 frames, frames 20 and 80 are chosen for the virtual key frames. Ideally, one of the frames chosen for a virtual key frame is near the beginning of the segment and the other frame is closer to the end of the segment. Each frame has an uncertainty associated with it. In box 172, a check is made to determine that the chosen frame does not have an uncertainty that exceeds a predetermined threshold. If it does, then in box 174, another frame is chosen. For example, if frame 20 has an uncertainty that exceeds the predetermined threshold then frame 21 or frame 19 may be chosen.

In box 176, 3D points are projected into each corresponding virtual key frame. In box 178, the uncertainty associated with each frame is projected into its corresponding virtual key frame.

Two virtual frames are used to represent each segment because at least two frames are desired for 3D reconstruction. The position of a virtual frame can coincide with one real frame, say k. Alternatively, the virtual frame does not have to coincide with a real frame. A virtual frame contains the projection of the 3D reconstructed points, denoted by $\bar{u}_{ik}=[\bar{u}_{ik}, v_{ik}]$, and its covariance matrix $\Lambda u_{ik}$. They are given by $$\bar{u}_{ik} = \frac{1}{p_{k2}^T \tilde{x}_i} \begin{bmatrix} p_{k0}^T \tilde{x}_i \\ p_{k1}^T \tilde{x}_i \end{bmatrix} \equiv f(m_k, x_i)$$

$$\Lambda u_{ik} = \frac{\partial f}{\partial m} \Lambda m_k \frac{\partial f^T}{\partial m} + \frac{\partial f}{\partial x} \Lambda x_i \frac{\partial f^T}{\partial x}$$

where the derivatives $\partial f/\partial m$ and $\partial f/\partial x$, are evaluated at $m_k$ and $x_i$. Let $m_k=[\omega_k^T, t_k^T]^T$ be the motion of the kth camera and $\Lambda_{mk}$ its covariance matrix. Let $x_i$ be the $i^{th}$ reconstructed 3D point and $\Lambda_x$ be its covariance matrix. In computing $\Lambda u_x$ as shown above, there is an assumption that the uncertainty in $m_k$ and $x_i$ is independent, and experimentally it was found that their correlation is negligible because the motion is computed from many data points.

Now uncertainty of the parameters obtained from nonlinear least squares is computed. More details of this computation can be found in the Zhang article referenced above.

Let $\hat{y}$ be the parameter vector which minimizes $C(x,z)$ where x is the data vector. Its covariance matrix is then given by $$\Lambda_y = H^{-1} \frac{\partial \Phi}{\partial x} \Lambda_x \left(\frac{\partial \Phi}{\partial x}\right)^T H^{-T}$$

where $\phi = \partial C(x,\hat{y})/\partial y$ and $H = \partial \phi/\partial y$.

If $C(x,z)$ is in the form of sum of squares, i.e., $$\sum_{i=1}^{n} C_i^2(x, z)$$

and if $C_i(x,z)$ can be considered as zero and independent identical distributed errors, then the following simple form is achieved:

$$\Lambda_y = \frac{2C(x, \hat{y})}{n - p} H^{-1}$$

where p is the parameter vector dimension, and H can be approximated under first order approximation as $$H = 2 \sum_i \left(\frac{\partial C(x, \hat{y})}{\partial y}\right)^T \frac{\partial C(x, \hat{y})}{\partial y}.$$

As indicated at boxes 180 and 182 (FIG. 8), each segment is represented using virtual key frames and the process is repeated for each segment. After all the segments are complete, a final bundle adjustment is done in box 182.

Bundle Adjustment with Virtual Frames

Bundle adjustment assumes that all image points are corrupted by independent and identically distributed noise. To incorporate virtual frames together with real ones, it is desirable to reformulate the problem in order to account for different noise distribution. Maximum likelihood estimation is equivalent to minimizing the following function:

$$\sum_k \sum_i (\bar{u}_{ik} - \hat{u}_{ik})^T \Lambda_{u_{ik}}^{-1} (\bar{u}_{ik} - \hat{u}_{ik}),$$

where $\bar{u}_{ik}$ and $\Lambda_{uik}$ are given by the last two equations if they are from virtual frames, or simply the detected image points if they are from real images; and $\hat{u}_{ik}$ is the projection of the estimated 3D point $x_i$ at image k. This is simply the weighted version of the standard bundle adjustment.

For better 3D reconstruction it may be desirable to calibrate the focal length using methods described in "*Self-calibration and metric reconstruction in spite of varying and unknown internal camera parameters*" by M. Pollefeys et al. (ICCV '98).

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

For example, although two virtual key frames are chosen as being two predetermined frames (e.g., 20 and 80), instead each frame can be examined to determine the optimal frames to use to create virtual key frames.

Additionally, although some of the methods described herein use bundle adjustment, other methods for SFM may be used. Some methods for SFM include factorization ["*Shape and motion from image streams under orthography: A factorization method*" by C. Tomasi et al. (International Journal of Computer Vision, November, 92) and "*A factorization based algorithm for multi-image projective structure and motion*" by P. Sturm et al. (ECCV '96) and sequential or recursive estimation ["*Recursive affine structure and motion from image sequences*" by P. F. McLauchlan et al. (ECCV '94) and "*Recursive estimation of motion, structure, and focal length*" by A. Azarbayejani et al. (IEEE transactions on Pattern Analysis and Machine Intelligence, June 1995)].

In view of the many possible embodiments to which the principles of our invention may be applied, it should be recognized that the detailed embodiments are illustrative only and should not be taken as limiting the scope of our invention. Rather, we claim as our invention all such embodiments as may come within the scope of the following claims and equivalents thereto.

We claim:

1. A method of recovering a three-dimensional scene from two-dimensional images, the method comprising:
   providing a sequence of frames;
   dividing the sequence of frames into frame segments comprising at least one base frame and at least one next frame wherein the frames in the sequence comprise feature points and wherein the sequence of frames is divided into frame segments based upon the at least one next frame in each frame segment having at least a minimum number of feature points being tracked to the at least one base frame in the frame segment;
   performing three-dimensional reconstruction individually for each frame segment derived by dividing the sequence of frames; and
   combining the three-dimensional reconstructed segments together to recover a three-dimensional scene for the sequence of images.

2. The method of claim 1 wherein performing includes creating at least two virtual key frames for each of the segments, wherein the virtual key frames are only a subset of the images in a segment but are a representation of all of the images in that segment.

3. The method of claim 1 wherein performing further includes:
   performing a two-frame structure-from-motion algorithm to create a plurality of local models for each segment; and
   combining the plurality of local models by eliminating scale ambiguity.

4. The method of claim 3 further comprising:
   bundle adjusting the combined local models to obtain a partial three-dimensional model for each segment;
   extracting virtual key frames from the partial three-dimensional model, wherein the virtual key frames include three-dimensional coordinates for the images and an associated uncertainty; and
   bundle adjusting all segments to obtain a complete three-dimensional model.

5. The method of claim 1 further including:
   identifying feature points in the images;
   estimating three-dimensional coordinates of the feature points; and
   estimating a camera rotation and translation for a camera that captured the sequence of images.

6. The method of claim 1 wherein combining includes performing a non-linear minimization process across the different segments through bundle adjustment.

7. A computer-readable medium having computer-executable instructions for performing the method recited in claim 1.

8. A method of recovering a three-dimensional scene from two-dimensional images, the method comprising:
   identifying a sequence of two-dimensional frames that include two-dimensional images;
   dividing the sequence of frames into segments, wherein a segment includes a plurality of frames and wherein dividing includes: identifying a base frame, identifying feature points in the base frame; and determining the segments such that every frame in a segment has at least a predetermined percentage of feature points identified in the base frame;
   for each segment, encoding the frames in the segment into at least two virtual frames that include a three-dimensional structure for the segment and an uncertainty associated with the segment and wherein encoding includes choosing at least two frames in the segment that are at least a threshold number of frames apart;
   for each of the at least two chosen frames, projecting a plurality of three-dimensional points into a corresponding virtual frame; and
   for each of the at least two chosen frames, projecting an uncertainty into the corresponding virtual frame.

9. The method of claim 8 wherein the segments vary in length and wherein the length is associated with the number of frames in the segment.

10. The method of claim 8 further including:
    identifying feature points in the sequence of two-dimensional frames;
    estimating three-dimensional coordinates for the feature points; and
    estimating camera rotation and translation for the feature points.

11. The method of claim 10 wherein estimating the three-dimensional coordinates includes applying a two-frame structure-from-motion algorithm to the sequence of two-dimensional frames.

12. The method of claim 8 further including:
    dividing a segment into multiple frame pairs;
    applying a two-frame structure-from-motion algorithm to the multiple frame pairs to create a plurality of local models; and
    scaling the local models so that they are on a similar coordinate system.

13. The method of claim 12 wherein each of the multiple frame pairs includes a common base frame and one other frame in the segment.

14. The method of claim 13 further including interpolating frames between the multiple frame pairs.

15. The method of claim 8 further including bundle adjusting the virtual frames from the segments to create a three-dimensional reconstruction.

16. The method of claim 8 further including identifying feature points in the frames by using motion estimation.

17. The method of claim 16 wherein the motion estimation includes:
    creating a template block in a first frame including a feature point and neighboring pixels adjacent the feature point;
    creating a search window used in a second frame; and
    comparing an intensity difference between the search window and the template block to locate the feature point in the second frame.

18. The method of claim 8 wherein at most two virtual frames are used.

19. A computer-readable medium having computer-executable instructions for performing the method recited in claim 8.

20. A method of recovering a three-dimensional scene from a sequence of two-dimensional frames, comprising:
    (a) identifying at least a first base frame in a sequence of two-dimensional frames;
    (b) adding the at least first base frame to create a first segment of frames of the sequence;
    (c) selecting feature points in at least the first base frame in the first segment of frames in the sequence;
    (d) analyzing a next frame in the sequence to identify the selected feature points in the next frame;

(e) determining a number of the selected feature points from the base frame that are also identified in the next frame; and (f) if the number of the selected feature points from the base frame that are also identified in the next frame is greater than or equal to a threshold number, adding the next frame to the first segment of frames of the sequence.

21. The method of claim 20 further including if the number of the selected feature points from the base frame that are also identified in the next frame is less than the threshold number, adding the next frame to a second segment of frames of the sequence and designating the next frame that falls below the threshold number as a second base frame in a second segment.

22. The method of claim 20 further including performing motion estimation to identify the feature points.

23. The method of claim 20 further including using corners as the feature points.

24. The method of claim 20 wherein the number of frames comprising a segment varies between segments.

25. The method of claim 20 further including creating two virtual key frames per segment.

26. The method of claim 25 further including bundle adjusting the virtual key frames of all the segments to obtain a three-dimensional reconstruction.

27. A computer-readable medium having computer-executable instructions for performing the method recited in claim 20.

28. In a method of recovering a three-dimensional scene from a sequence of two-dimensional frames, an improvement comprising dividing a long sequence of frames into segments and reducing the number of frames in each segment by representing the segments using between two and five representative frames per segment, wherein the representative frames are used to recover the three-dimensional scene and remaining frames are discarded so that the three-dimensional scene is effectively compressed, wherein dividing the long sequence into segments includes identifying a base frame and tracking feature points between frames in the sequence and the base frame and ending a segment whenever a frame does not contain a predetermined threshold of feature points that are contained in the base frame.

29. The method of claim 28 wherein each of the representative frames have an uncertainty associated therewith.

30. The method of claim 28 wherein the long sequence includes over 75 frames.

31. The method of claim 28 wherein dividing the long sequence into segments includes identifying a base frame and tracking feature points between frames in the sequence and the base frame and ending a segment whenever a frame does not contain a predetermined threshold of feature points that are contained in the base frame.

32. The method of claim 28 further including performing a two-frame structure-from-motion algorithm on each of the segments to create a partial model.

33. A computer-readable medium having computer-executable instructions for performing a method comprising:

providing a sequence of two-dimensional frames;

dividing the sequence into segments, each segment having at least two frames;

calculating a partial model for each segment, wherein the partial model includes the same number of frames as the segment said partial model represents and wherein the partial model includes three-dimensional coordinates and camera pose, the camera pose comprising rotation and translation, for features within the frames;

extracting virtual key frames from each partial model, the virtual key frames having three-dimensional coordinates for the frames and an uncertainty associated with the frames; and bundle adjusting the virtual key frames to obtain a complete three-dimensional reconstruction of the two-dimensional frames.

34. An apparatus for recovering a three-dimensional scene from a sequence of two-dimensional frames by segmenting the frames, comprising:

means for capturing two-dimensional images;

means for dividing the sequence into segments comprising at least two frames;

means for calculating a partial model for each segment that includes three-dimensional coordinates and camera pose for features within the frames of the segment, the three-dimensional coordinates and camera pose being derived from the frames of the segment;

means for extracting virtual key frames from each partial model; and means for bundle adjusting the virtual key frames to obtain a complete three-dimensional reconstruction of the two-dimensional frames.

* * * * *